United States Patent Office 3,447,426
Patented June 3, 1969

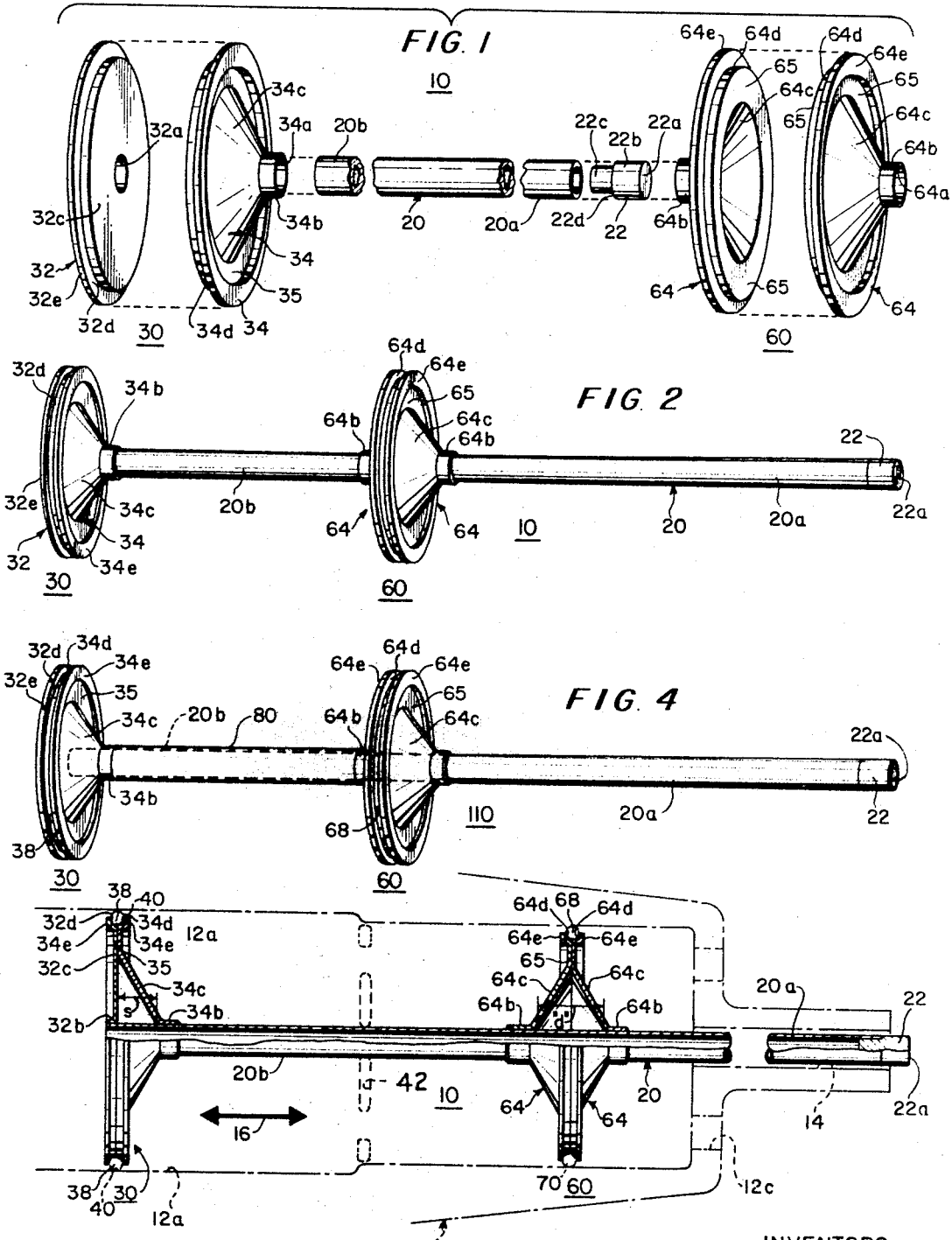

3,447,426
PISTON AND DRIVER ASSEMBLY FOR FLUID OPERATED FASTENER DRIVING TOOLS
Allen R. Obergfell, Park Ridge, Ill., assignor to Fastener Corporation, Franklin Park, Ill., a corporation of Illinois
Filed Apr. 28, 1967, Ser. No. 634,628
Int. Cl. F16j 1/12
U.S. Cl. 92—175                                 12 Claims

ABSTRACT OF THE DISCLOSURE

A piston and driver assembly for fluid operated fastener driving tools comprising a unitary, elongated, hollow stem including a plug at one end of the stem adapted for driving engagement with fasteners positioned in the drive track of the tool. A piston is mounted on the stem remote from the plug, and the piston comprises a pair of thin, circular piston members extending outwardly of the stem, each member having a central opening and a flanged portion around the opening which is secured to the stem. The piston members are joined to one another around an annular ringlike area spaced radially outward of the stem, and each member is formed with a shoulder around its outer periphery which is adapted to cooperate with the shoulder of the adjacent member to form a seating space for a replaceable resilient annular sealing ring. In driving tools employing differential cylinders for automatic piston return, the piston and driver assembly includes a second piston of similar construction spaced intermediate the plug and first-mentioned piston.

---

The present invention relates to a new and improved piston and driver assembly for fluid operated fastener driving tools. Because of the high amount of energy required to drive large fasteners, such as common nails and the like, the piston and driving assemblies in fastener driving tools capable of driving such nails are subjected to repeated and extremely high stresses and shock loads. Piston assemblies capable of withstanding these repeated, high value stresses over long periods of tool life without fatigue failure have been difficult to design and construct, and in many cases it has been necessary to use large and heavy components with many resultant disadvantages. A heavier piston and driving assembly construction requires a large percentage of the fluid power available merely to overcome the increased inertia, and, accordingly, the amount of power available to actually drive the fasteners is reduced. Many prior art piston assemblies are of complex and complicated shapes and for the most part are formed by casting or forging, with resultant high machining costs and added weight.

Therefore, it is an object of the present invention to provde a new and improved piston and driver assembly for fluid operated fastener driving tools, which is simple in construction, low in cost, and light in weight, yet capable of withstanding repeated high stress applications.

Another object of the present invention is the provision of a new and improved piston and driver assembly of the character described which is strong and which has a long and useful service life, even though the repeated stress applications are of extremely high value.

Yet another object of the present invention is the provision of a new and improved piston and driver assembly which can be constructed without requiring any machining operations which are timely and costly.

Still another object of the present invention is the provision of a new and improved piston and driver assembly which requires a minimum number of component parts, some of which are formed of stamped sheet metal.

Yet another object of the present invention is the provision of a new and improved piston and driver assembly which is extremely light in weight and which is fabricated with a minimum amount of labor.

The foregong and other objects and advantages of the present invention are accomplished in one embodiment thereof by providing a piston and driver assembly having an elongated, hollow, unitary piston and driver stem with means at one end of the stem adapted for driving engagement with fasteners positioned in the drive track of a driving tool. Piston means are mounted on the stem remote from the driving end and comprise a pair of thin, annular circular members which may be constructed of stamped sheet metal and which extend outwardly of the axis of the stem. Each of the circular members includes a central opening defined therein, and flanged means formed around the opening is secured directly to the stem by appropriate means, such as by welding. Each piston member is joined to the other around an annular ring-like region spaced outwardly of the stem to provide a strong, lightweight piston structure capable of withstanding the repeated high stresses involved and imparting the necessary force required to drive fasteners to the elongated hollow stem.

For a better understanding of the present invention reference should be had to the following detailed description when taken in conjunction with the drawings, in which:

FIG. 1 is an exploded, perspective view illustrating the component parts of one embodiment of a new and improved piston and driver assembly constructed in accordance with the features of the present invention;

FIG. 2 is a perspective view of the piston and driver assembly formed by assembly of the component parts illustrated in FIG. 1;

FIG. 3 is a side elevational view of the assembled piston and driver assembly of FIG. 2 with portions in cross section and illustrating the piston mounted for sliding movement within the cylinder of a fastener driving tool (the cylinder outline being shown in dotted lines).

FIG. 4 is a perspective view of another embodiment of a piston and driver assembly constructed in accordance with the present invention.

Referring now, more particularly, to the drawings, and especially FIGS. 1, 2, and 3, therein is illustrated a new and improved piston and driver assembly 10 adapted for use in fluid operated driving tools and the like. A driving tool having a cylinder 12 and drive track 14 is shown in dotted lines in FIGS 3 and the piston and driver assembly 10 is adapted for reciprocal sliding movement therein, as indicated by the arrow 16.

The piston and driver assembly 10 includes an elongated, lightweight, hollow, tubular driver stem 20 having the desired length and having an outer diameter dimensioned so that a driver stem portion 20a thereof will slide easily within the drive track 14 (FIG. 3) of the driving tool in which the assembly is to be used. The tubular stem 20 includes the driver portion 20a forming the driver of the tool and an integral piston supporting portion 20b which supports a piston member in a manner to be described more fully hereinafter. In order to help the piston and driver assembly 10 absorb and distribute the high stress impact loads encountered as fasteners are driven, a solid plug member 22 is inserted into the outer end of the driver stem portion 20a of the stem.

The plug 22 includes a flat outer driving face 22a adapted to drivingly engage the head of a nail or other fastener during each driving stroke of the tool. The plug is formed with a body portion 22b having a diameter equal to the outer diameter of the stem 20 and includes a pin portion 22c of reduced diameter adapted to extend and closely fit into the end of the hollow driver stem 20a. After the plug 22 is inserted into the end of the driver stem portion 20a (FIG. 2) it is secured in place by spot welding or soldering between the outer surface of the pin 22c and the inner surface of the driver stem.

The plug includes a radial annular shoulder 22d between the pin portion 22c and main body 22b, and the radial shoulder bears directly against and is preferably soldered to the end of the driver stem portion 20a. The plug absorbs most of the impact shock upon the initiation of a driving stroke and transmits the force smoothly and uniformly to the hollow stem 20.

The piston and driver assembly 10 includes a piston member 30 mounted at the opposite end on the support portion 20b of the stem. The piston assembly 30 includes a pair of thin, circular piston members 32 and 34 which are secured to one another and to the stem portion 20b in a manner providing an extremely strong, yet lightweight structure. The piston member 32 is preferably formed of stamped sheet metal and includes a central aperture 32a adapted to receive the stem portion 20b. The aperture 32a is formed by a cylindrical flange 32b (FIG. 3) having an inner diameter slightly larger than the stem portion 20b and joined thereto by soldering, brazing, welding, or other appropriate means. The piston member 32 includes an annular disklike portion 32c extending radially outwardly of the cylindrical flange 32b and around the periphery of the disklike portion is formed a shouldered recess 32d and an offset radial lip 32e. The piston member 34 is also preferably formed of stamped sheet metal and includes a central aperture 34a dimensioned to accommodate the stem portion 20b. The aperture 34a is formed by a cylindrical flange 34b adapted to be joined to the support stem portion 20b by brazing, spot welding, or soldering. Extending outwardly of the cylindrical flange 34b is a frustoconical portion 34c which terminates in a planar, annular, ringlike portion 35 adapted to face and bear against an outer, annular, ringlike portion on the disklike portion 32c of the piston member 32. The piston member 34 also includes a shouldered recess 34d facing the recess 32d and an offset radial, peripheral lip 34e parallel to and spaced from the lip 32e of the piston member 32. When the piston members 32 and 34 are assembled together, the shouldered recesses 32d and 34d and the lips 32e and 34e define an annular space 38 (FIG. 3) around the assembled piston structure 30, which is adapted to hold an annular sealing ring or O-ring 40 (shown in dotted lines (FIG. 3)). The O-ring 40 is preferably formed of resilient plastic material and is adapted to slidingly seal between piston structure 30 and a wall portion 12a of the cylinder 12 of the tool.

The centrally disposed, cylindrical flanges 32b and 34b of the piston members 32 and 34, respectively, are spaced apart from one another on the stem portion 20b by a distance s (FIG. 3) because of the frustoconical portion 34c of the piston member 34 and, accordingly, the piston structure 30 is strong and well able to withstand high fluid pressure exerted against the disklike piston section 32c. The two piston members 32 and 34 are joined together between the ringlike portion 35 and the facing outer annular ringlike section of the disklike portion 32c by welding, soldering, or brazing, and the piston structure 30, thus formed, is strong, light in weight, and the individual components may be inexpensively produced by a punch press, or the like, from sheet stock. Moreover, no machining of the parts is required, and the cost is much less than if the piston and driver assembly were produced in a forging or casting process.

It is common in most pneumatic fastener driving tools to provide a plural piston arrangement in order that the piston and driver assembly may be actuated pneumatically on both a driving stroke in one direction and on a return stroke in the opposite direction after a driving stroke has been completed. In tools of this type, the cylinder structure 12 usually includes the upper cylinder section 12a which is slightly larger in diameter than a lower cylinder section 12b (FIG. 3). Also, one or more air ports 42 are provided in the cylinder wall adjacent the junction of the large and small diameter sections 12a and 12b in order to admit pressurized fluid into the cylinder beneath the piston structure 30 for moving the piston assembly on a return stroke after completion of the driving stroke. In order to prevent the pressurized fluid from acting on the underside (piston member 34) of the piston structure from escaping to the atmosphere from the lower end of the cylinder, which is usually vented by one or more vent passages 12c (FIG. 3) and to guide and stabilize the stem 20 intermediate its ends during a driving stroke, the piston and driver assembly 10 may include a second piston structure 60 slightly smaller in diameter than the piston structure 30 previously described and spaced intermediate the ends of the stem for sliding movement in the small diameter section 12b of the tool cylinder.

The piston structure 60 is generally similar in construction to the piston structure 30 and includes a pair of identical piston members 64 which are shaped similar to the piston member 34 previously described. The piston members 64 include frustoconical portions 64c and are disposed on the stem 20 with cylindrical flnages 64b thereof spaced apart by a distance d (FIG. 3). The flanges 64b are welded, soldered, or brazed to the stem 20 with the frustoconical portions 64c sloped opposite to one another outwardly of the stem, as shown in FIG. 3, and, accordingly, the piston structure 60 is strengthened by the hollow triangular shaped section. Each piston member 64 includes an annular, radial, ringlike area 65 which is joined to the ring-like area of the other member by soldering, welding, or brazing and each piston member also includes an outer shouldered recess 64d and an offset radial, peripheral lip 64e which cooperate to form an annular space 68 around the periphery of the piston structure to hold an annular sealing or O-ring 70. Preferably, the O-ring 70 is of resilient plastic material and slidingly seals between the periphery of the assembled piston structure 60 and the smaller diameter cylinder section 12b.

The spacing between the piston structures 30 and 60 on the stem 20 is determined by the length of the cylinder sections 12a and 12b and the length of stroke desired. In order to provide a differential fluid pressure to move the piston and driver assembly 10 on a return stroke, the effective area of the piston structure 30 is slightly larger than the area of the structure 60. This difference in effective area can be accomplished by making the O-ring 40 slightly larger in outer diameter than the O-ring 70, and when this is the case, the two piston members 64 of the piston structure 60 can be identical to the piston member 34 of the larger piston structure 30; further simplifying manufacture and lowering costs.

From the foregoing description, it can be seen that a multiple piston and driver assembly 10, in accordane with the present invention, can be easily and economically manufactured using a minimum number of component parts. A single tubular stem 20 serves as the piston support and driver, and the only other parts required are the plug 22, three identical piston members similar to the member 34 or 64, a piston member 32 and the O-rings 40 and 70. The piston members 32, 34, and 64 are readily stamped out of sheet stock in a punch press operation, and the components can be easily assembled in automatic processing machinery by brazing, welding, or soldering. The resultant assembly 10 is light in weight, strong, low in cost, and lends itself readily to mass production processes.

Referring now to FIG. 4, therein is illustrated another embodiment of a new and improved piston and driver assembly constructed in accordance with the present invention and referred to generally by the numeral 110. The assembly 110 is similar to the previous embodiment, and component parts in the assembly 110 identical with those of the previous embodiment are given identical reference numerals. The assembly 110 differs from the prior embodiment only by the addition of a tubular spacer 80 which is inserted onto the piston support portion 20b of the stem between the piston structure 30 and 60. Opposite ends of the tubular spacer 80 bear against the facing ends of the cylindrical flanges 34b and 64b of the respective piston structures 30 and 60, and in this manner the spacing between the piston assemblies is positively maintained.

Although the present invention has been described with reference to several illustrative embodiments thereof, it should be understood that numerous other modifications and embodiments can be devised by those skilled in the art that will fall within the spirit and scope of the principles of this invention.

What is claimed and desired to be secured by Letters Patent of the United States is:

1. A piston and driver assembly for a fluid operated fastener driving tool comprising an elongated, unitary, tubular driver stem, plug means at one end of said stem adapted for driving engagement with a fastener positioned in the drive track of a tool, and a piston mounted on said stem remote from said one end comprising a pair of annular, circular piston members formed of thin sheet material and extending outwardly of the axis of said stem, each of said piston members having a central opening defined therein by cylindrical wall means rigidly secured directly to said stem, each of said piston members including an annular ringlike surface spaced concentrically outwardly around said stem in direct contact against and rigidly joined to said surface of the other piston member.

2. The assembly of claim 1 wherein said cylindrical wall means of said piston members are spaced apart longitudinally on said stem.

3. The assembly of claim 1 wherein at least one of said piston members includes a frustoconical portion extending outwardly of said stem between said cylindrical wall means and said annular ringlike surface.

4. The assembly of claim 3 wherein the other of said piston members includes a frustoconical portion extending outwardly of said stem between said cylindrical wall means and said annular ringlike surface.

5. The assembly of claim 1 wherein each of said piston members includes an annular recess adjacent the perimeter thereof and facing the recess of the other member to form an annular cavity for holding a resilient sealing ring around the perimeter of said piston means.

6. A piston and driver assembly for a fluid operated fastener driving tool comprising an elongated, unitary, hollow, tubular driver stem, plug means at one end of said stem adapted for driving engagement with a fastener positioned in the drive track of a tool and a piston mounted on said stem remote from said plug means, said piston including a pair of annular, circular, piston walls formed of thin sheet material and extending outwardly of the axis of said stem, each wall having a central opening therein defined by a cylindrical flange segment fixedly secured directly to said stem, each wall including an annular surface spaced coaxially outwardly of said cylindrical flange segment thereof in direct contact against and joined to the annular surface of the other piston wall.

7. The assembly of claim 6 wherein the cylindrical flange segments of said piston walls are spaced apart longitudinally on said stem and one of said piston walls includes a frustoconical portion extending outwardly of said stem between said cylindrical flange segment and said annular ringlike surface thereof.

8. The assembly of claim 7 wherein each of said piston members includes an annular recess outwardly around said joined annular surface defining a wall surface of an annular cavity for holding a resilient sealing ring.

9. The assembly of claim 6 including a second piston spaced intermediately on said stem between said first mentioned piston and said plug means, said second piston including a pair of annular, circular piston walls formed of thin sheet material and extending outwardly of the axis of said stem each of said piston walls including a central opening defined by a cylindrical flange segment directly rigidly secured to said stem, said piston walls including an annular ringlike surface spaced coaxially outwardly around said stem and in direct contact with and rigidly joined to the ringlike surface of the other piston wall.

10. The assembly of claim 9 wherein each piston wall of said second piston includes a frustoconical portion extending outwardly of said stem between said flange segment and said annular ringlike surface thereof.

11. The assembly of claim 9 including tubular spacing means on said stem between said first mentioned piston and said second piston.

12. The apparatus of claim 9 wherein each of said pistons includes an annular cavity formed around the perimeter for holding a resilient sealing ring, the cavity of one piston having a different diameter than the cavity of the other.

References Cited

UNITED STATES PATENTS

| | | | |
|---|---|---|---|
| 2,703,557 | 3/1955 | Polki | 92—175 X |
| 2,394,488 | 2/1946 | Rotter et al. | 92—243 X |
| 2,632,678 | 3/1953 | Gault | 92—250 |
| 2,834,298 | 5/1958 | Wright et al. | 92—243 X |
| 3,169,452 | 2/1965 | Dugin | 91—398 |
| 3,176,592 | 4/1965 | Wandel | 91—457 |
| 3,189,233 | 6/1965 | Wilson | 92—250 X |
| 3,194,324 | 7/1965 | Langas | 173—2 |
| 3,259,292 | 7/1966 | Maynard | 227—8 |
| 497,358 | 5/1893 | Strong | 92—175 |
| 2,598,271 | 5/1952 | Klosterman | 92—175 X |
| 2,623,501 | 12/1952 | Audemar | 92—175 X |

FOREIGN PATENTS

| | | |
|---|---|---|
| 647,339 | 8/1962 | Canada. |

CARROLL B. DORITY, JR., *Primary Examiner.*

U.S. Cl. X.R.

92—249